United States Patent [19]

Strauven et al.

[11] Patent Number: 5,425,913
[45] Date of Patent: Jun. 20, 1995

[54] ZINC ALLOY FOR ELECTROCHEMICAL BATTERY CANS

[75] Inventors: Yvan A. Strauven, Neerpelt; André F. Skenzai, Heverlee, both of Belgium

[73] Assignee: S.A.ACEC-Union Miniere N.V., Belgium

[21] Appl. No.: 218,586

[22] Filed: Mar. 28, 1994

Related U.S. Application Data

[63] Continuation of Ser. No. 652,533, Feb. 8, 1991, abandoned.

[30] Foreign Application Priority Data

Feb. 8, 1990 [BE] Belgium .................. 09000147

[51] Int. Cl.⁶ .................................. C22C 18/00
[52] U.S. Cl. ............................ 420/514; 420/520; 429/176
[58] Field of Search ................. 920/513, 514, 520; 429/168, 176

[56] References Cited

U.S. PATENT DOCUMENTS

| | | | |
|---|---|---|---|
| 4,432,937 | 2/1984 | Kuwayama | 420/513 |
| 4,952,368 | 8/1990 | Skenazi et al. | 420/513 |

FOREIGN PATENT DOCUMENTS

| | | |
|---|---|---|
| 0172255 | 2/1986 | European Pat. Off. |
| 423865 | 4/1991 | European Pat. Off. |
| 890.865 | 2/1944 | France |
| 33-3204 | 12/1956 | Japan |
| 54-38050 | 11/1979 | Japan .................. 420/513 |
| 61-88451 | 5/1986 | Japan |

*Primary Examiner*—George Wyszomierski
*Attorney, Agent, or Firm*—Lowe, Price, LeBlanc & Becker

[57] ABSTRACT

The alloy is free from cadmium and it contains 0.001–1% In, 0.005–1% Mn and possibly up to 1% Pb, 0.005–1% Al and/or 0.0005–0.1% REM, REM being a rare earth metal or a mixture of rare earth metals. These alloys have a sufficient mechanical strength and resistance to corrosion and are easy to be processed.

9 Claims, No Drawings

ZINC ALLOY FOR ELECTROCHEMICAL BATTERY CANS

This is a continuation of application Ser. No. 07/652,533, filed Feb. 8, 1991 now abandoned, and the benefits of 35 USC 120 are claimed relative to it.

The present invention relates to an indium- and manganese bearing zinc alloy for electrochemical battery cans.

Such an alloy is known from Chemical Abstracts, Vol. 106, 1987, 36009f. This known alloy contains, besides zinc, indium and manganese, further also lead and cadmium. This known alloy has the drawback to contain the very toxic element Cd.

The aim of the present invention is to provide an indium- and manganese bearing zinc alloy for battery cans, which contains no cadmium and still has a sufficient mechanical strength, processability and resistance to corrosion.

The alloy according to the invention is free from cadmium and it contains 0.001–1% In and 0.005–1% Mn (by % is meant here and hereafter percentage by weight). This alloy may further also contain up to 1% Pb.

The remaining constituents of the alloy according to the invention are either zinc and unavoidable impurities, or zinc, unavoidable impurities and small quantities of other elements, such as for instance 0.005–1% Al and-/or 0.0005–0.1% REM (REM being a rare earth metal or a mixture of rare earth metals). Unavoidable impurities are the impurities which are present in the zinc and in the elements which are added to the zinc to obtain the alloy. Therefore, the above used expression "The ahoy according to the invention is free from cadmium" should be understood as follows: the ahoy according to the invention does not contain cadmium, unless eventually as an unavoidable impurity.

The indium content shah be at least 0.001% and the manganese content at least 0.005%; otherwise the mechanical strength and/or the resistance to corrosion are insufficient.

The indium content shall not exceed 1%; higher contents impair the processability and increase unnecessarily the price of the ahoy. Advantageously the indium content shall not exceed 0.1% and preferably not 0.05%. An indium content of up to 0.02% is still more preferred and most preferred is an indium content of up to 0.01%. Preferably the indium content shah be at least 0.003%.

The manganese content shall not exceed 1%; otherwise such an amount of intermetallic Zn-Mn compounds is formed that cracks may be produced when the alloy is rolled. Preferably the manganese content is 0.005–0.1% and still more preferably 0.005–0.05%.

If lead is present in the alloy of the invention, its content shall not exceed 1%; at higher lead contents corrosion problems may occur. Preferably the lead content shall not exceed 0.3%. Still more preferably, the lead content shall not exceed 0.05% and most preferably not 0.005%.

EXAMPLE

The description hereafter of a comparative test proves that the mechanical strength and the resistance to corrosion of a can for electrochemical batteries made from an alloy according to the invention are substantially equivalent to those of a can made from a known alloy containing cadmium.

Starting from thermally refined zinc two alloys were prepared, whose compositions are as follows:

(1) Zn-0.025% Pb-0.01% In-0.05% Mn (2) Zn-0.25% Pb-0.06% Cd

These two alloys were processed into cans in an industrial unit in the traditional way: the cast material was rolled into strips, in which hexagonal slugs were stamped out; and the slugs were extruded into cans. Alloy (1) was processed as easily as alloy (2).

The tensile strength (in MPa) was determined on test pieces cut from the can wall in the extrusion direction; the stretching rate was 1 cm/min. The tensile strength was found to be 187.9 MPa for alloy (1) and 179.4 MPa for alloy (2).

In order to determine the resistance to corrosion use was made of an industrial electrolyte of $ZnCl_2$. Five cans of each alloy were immersed for 4 days in the electrolyte which was kept at 45° C. After the immersion the loss of weight of the 5 cans as a whole was determined (in gram) and the rate of corrosion was calculated (in microgram per $cm^2$ and per day).

The results are summarized in table 1.

TABLE 1

| Composition | Loss of weight g | Rate of corrosion μg/cm2/day |
|---|---|---|
| (1) | 0.2376 | 100.4 |
| (2) | 0.2384 | 100.8 |

From these results it appears that the resistance to corrosion of alloy (1) is equivalent to the one of alloy (2). After the immersion these cans were also examined microscopically. One ascertains that both alloys are absolutely equivalent with regard to their resistance to pitting corrosion.

The alloy (1) is an alloy according to the invention. Other typical examples of alloys according to the invention have the following composition:

Zn-0.1% In-0.005% Mn
Zn-0.05% In-0.005% Mn
Zn-0.02% In-0.005% Mn
Zn-0.01% In-0.005% Mn
Zn-0.003% In-0.005% Mn
Zn-0.003% In-0, 1% Mn
Zn-0.003% In-0.05% Mn
Zn-0.01% In-0.05% Mn
Zn-0.01% In-0.1% Mn
Zn-0.02% In-0.05% Mn
Zn-0.02% In-0.1% Mn
Zn-0.05% In-0.1% Mn
Zn-0.05% In-0.05% Mn
Zn-0.1% In-0.05% Mn
Zn-0.1% In-0.1% Mn
Zn-0.1% In-0.005% Mn-0.05% Pb
Zn-0.01% In-0.05% Mn-0.2% Pb
Zn-0.007% In-0.05% Mn-0.025% Pb
Zn-0.005% In-0.05% Mn-0.2% Pb
Zn-0.005% In-0.05% Mn-0.025% Pb
Zn-0.05% In-0.005% Mn-0.01% Al
Zn-0.02% In-0.005% Mn-0.1% Al
Zn-0.01% In-0.005% Mn-0.1% Al-0.01% REM
Zn-0.003% In-0.005% Mn-0.3% Pb-0.01% REM
Zn-0.003% In-0.1% Mn-0.005% Pb-0.01% Al

Zn-0.003% In-0.05% Mn-03% Pb
Zn-0.01% In-0.05% Mn-0.05% Pb-0.02% Al
Zn-0.01% In-0.1% Mn-0.005% Pb
Zn-0.02% In-0.05% Mn-0.005% Pb-0.01% Al-0.001% REM
Zn-0.02% In-0.1% Mn-0.02% Al-0.01% REM
Zn-0.05% In-0.1% Mn-0.02% Al-0.002% REM
Zn-0.05% In-0.05% Mn-0.1% Al-0.005% REM
Zn-0.1% In-0.05% Mn-0.005% Pb-0.002% REM
Zn-0.1% In-0.1% Mn-0.005% Pb-0.005% Al-0.0001% REM

When preparing these alloys one starts from thermally or electrolytically refined zinc and in order to introduce REM one can use either misch metal, an alloy with some 45% Ce, 45% La and 10% other rare earth metals, or an aluminum master alloy with 4% La and 4%Ce.

We claim:

1. An electrochemical battery can made of a cadmium-free alloy which in addition to zinc and unavoidable impurities is composed of only
   (1) 0,001–1.0% In
   (2) 0.005–1.0% Mn
   (3) up to 0.005% Pb, and
   (4) optionally at least one of
      (a) 0.005–1.0% Al, and
      (b) 0.0005–0.1% of a rare earth metal or a mixture of rare earth metals.

2. An electrochemical battery can according to claim 1 which contains up to 0.1% In.

3. An electrochemical battery can according to claim 2 which contains up to 0.05% In.

4. An electrochemical battery can according to claim 3 which contains up to 0.02% In.

5. An electrochemical battery can according to claim 4 which contains up to 0.01% In.

6. An electrochemical battery can according to claim 1 which contains at least 0.003% In.

7. An electrochemical battery can according to claim 1 which contains up to 0.1% Mn.

8. An electrochemical battery can according to claim 7 which contains up to 0.05% Mn.

9. An electrochemical battery can according to claim 1 which is essentially free of Pb.

* * * * *

UNITED STATES PATENT AND TRADEMARK OFFICE
CERTIFICATE OF CORRECTION

PATENT NO. : 5,425,913
DATED : June 20, 1995
INVENTOR(S) : Yvan A. Strauven et al.

It is certified that error appears in the above-indentified patent and that said Letters Patent is hereby corrected as shown below:

```
Column 1, line 29, change "At" to --Al--;
Column 1, line 34, change "ahoy" to --alloy--;
Column 1, line 36, change "ahoy" to --alloy--;
Column 1, line 45, change "ahoy" to --alloy--;
Column 1, line 49, change "shah" to --shall--.
Column 3, line 22, change "0,001" to --0.001--.
```

Signed and Sealed this

Twenty-third Day of January, 1996

BRUCE LEHMAN

Attest:

Attesting Officer

Commissioner of Patents and Trademarks